3,513,923
PORTABLE SCALES WITH AXLE ACTING AS FULCRUM
Wlodzimierz Rast and Shirley I. Rast, Flinders Park, South Australia, Australia, assignors to Rast Patents Pty. Ltd., Adelaide, South Australia, Australia
Filed Nov. 7, 1967, Ser. No. 681,215
Claims priority, application Australia, Nov. 14, 1966, 13,866/66
Int. Cl. G01g *19/08*
U.S. Cl. 177—140                    5 Claims

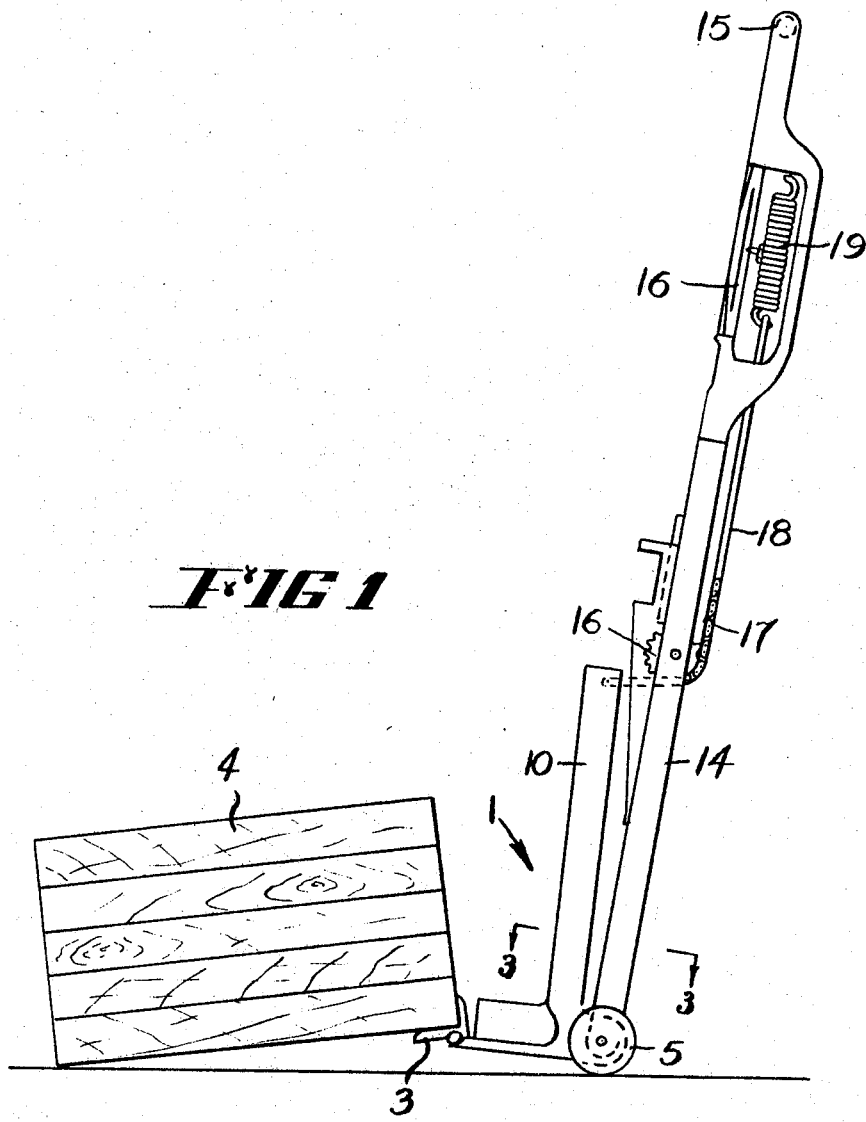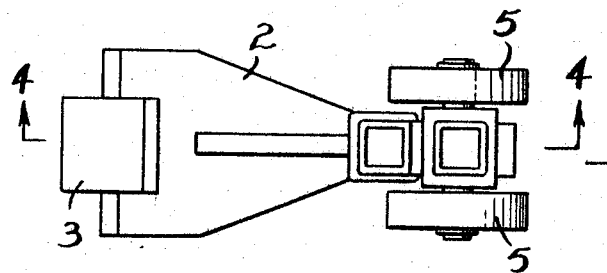

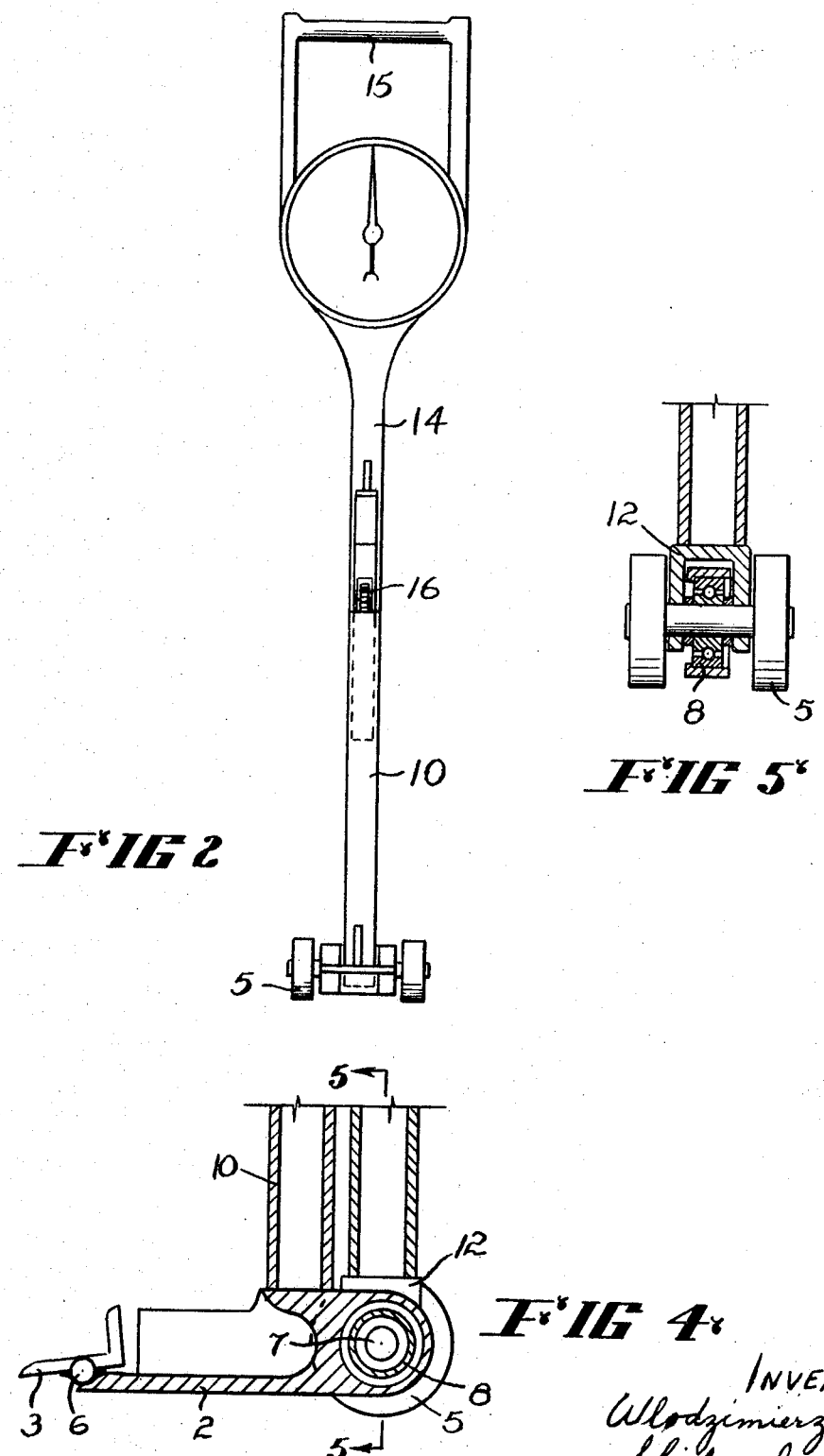

ABSTRACT OF THE DISCLOSURE

A portable weighing device with a foot to engage one lower edge of an object to be weighed and means on the weighing device to raise the foot and thereby raise the edge of the object clear of the floor, indicating means to show the weight of the raised edge and repeating the operation at the opposite lower edge whereby the sum of the two indicated weights provides the weight of the object.

---

This invention relates to a portable scales.

One of the problems in supplying portable scales for the weighing of heavy objects is to be able to provide a unit which can be moved into position and can give a reading of the weight of the object without causing error through misplacement either of the unit or through incorrect operation.

It will be realised that in any system of this type a leverage problem results and with scales as known heretofore the actual position at which the operator grasps the unit to operate it is very critical and if incorrect handling takes place, then incorrect weighing will result.

The present invention is based on the principle that a heavy object lying on the ground can be weighed by lifting two opposite edges and adding the weights so obtained and a scale according to this invention therefore comprises a weighing frame which has a foot which can be engaged under the object to be weighed, which weighing frame is coupled to the scales on an operating frame in such a manner that as the operating frame is moved to lift the foot of the weighing frame, the weight of the object on the foot will be automatically recorded.

Thus the invention can conveniently comprise an operating frame, a handle on the operating frame to allow the operating frame to be tilted about a fulcrum which can conveniently be the axle of wheels which support the opposite end of the operating frame to that on which the handle is formed, a weighing frame hingedly connected to the operating frame such as by engaging the weighing frame on the said axle, a foot on the weighing frame adapted to engage an object to be weighed, loading means such as a spring within or external to scales to urge the weighing frame into a fixed relationship with the operating frame, and a scale disposed between the weighing frame and the operating frame whereby the extent of deflection of the operating frame in relation to the weighing frame against the loading means is recorded on the scales.

As stated previously, because of the use of a lever system involved in this type of weighing it is necessary to so arrange the portable scale structure that errors in the scale are not brought about by incorrect manipulation and according to this invention therefore the portable scales comprises a weighing frame and hingedly connected thereto an operating frame so arranged that differential motion between the weighing frame and the operating frame will actuate the scales.

This object can be achieved in various ways but to enable the invention to be fully appreciated an embodiment will now be described but it is to be clear that the invention need not necessarily be limited to this, the scope being defined in the claims herein.

In the drawings:
FIG. 1 is a side elevation of the scales showing a case being weighed thereby,
FIG. 2 is a front elevation of the scales,
FIG. 3 is an enlarged sectional view on line 3—3 of FIG. 1,
FIG. 4 is a central section on line 4—4 of FIG. 3, and
FIG. 5 is a transverse section as on line 5—5 of FIG. 4.

The weighing frame 1 comprises a substantially horizontally disposed foot 2 having at one end a pivoted engaging member 3 which engages the case 4 or the like which is to be weighed and at its other end a pair of wheels 5 which contact the ground and provide a fulcrum for the unit and also provide the means whereby the unit can be wheeled from place to place. The member 3 which engages the case is hinged to the foot 2 by a pin 6 and is of angle shape to engage one edge of the case, the purpose of the pin 6 being to provide an exact measuring distance between the engaging member and the axle 7 of the wheels 5 about which the weighing is taking place. This ensures the exact ratio irrespective of the manner in which the edge of the case or package rests on the hinged engaging member. The axle acts as a fulcrum for the scales.

The foot 2 has a ball bearing 8 housed in it which engages the axle 7 of the wheels 5 so as to reduce friction to a negligible amount when weighing.

Extending upwardly from the foot 2 of the weighing frame 1 is an upright 10 which is rigidly coupled to the foot so that it moves with the foot as one unit.

Engaged on the axle 7 of the wheels 5, is a U shaped bracket 12 which is secured to the upwardly extending operating frame 14 which terminates at its top in a handle 15 whereby the unit can be manipulated and which includes in it a scale 16 whereby weight can be recorded.

Disposed on the operating frame 14 is a sprocket wheel 16 around which a chain 17 passes which has its one end attached to the upright 10 which forms part of the weighing frame 1 and the other end attached to a cable 18 which in turn has its other end attached to the weighing mechanism of the scale 16, a weighing spring 19 being also attached to the cable 18. This spring can of course be included in the scales.

In this way the weighing mechanism of the scale 16 will normally hold the weighing frame 10 in a fixed relationship to the operating frame (due to the tension of the spring 19) and the weighing frame and the operating frame thus move as one unit about the axis of the ground wheels 5, allowing the scales to be wheeled into position for weighing. When weighing is to take place the engaging member 3 on the foot 2 of the weighing frame 1 is simply pushed beneath one edge of the crate 4 or the like of which the weight is to be taken by then exerting a pull on the handle 15, the upper part of the operating frame 14 will be moved away from the top of the upright 10 of the weighing frame against the tension applied by the spring 19 on the chain 17 so that the scales will move until such time as the weight of the object pressing on to the foot 2 of the weighing frame 1 will be taken by the weighing frame, whereupon further movement of the operating frame will carry the weighing frame with it and differential movement between the upright 10 and the operating frame 14 will cease, this of course then indicating the weight which is resting on the foot of the weighing frame on the scales.

It is not essential to use the engaging member 3 as the forward end of the foot 2 could itself engage the case or the like, but somewhat greater accuracy is assured if the member 3 is used because it transfers the weight to the pin 6 and thus ensures a precise effective leverage of the weighing frame.

From the foregoing it will be realised that a very simple and effective unit is envisaged which merely has two main members namely a weighing frame 1 and an operating frame 14 which are operatively hinged together at a point such as the wheel axes, and the relationship of one to the other being governed by the tension on the chain between the upright of the weighing frame.

By proportioning the lengths of the foot 2 (between the pin 6 and axle 7) in relation to the length of the upright 10 it will be realised that various leverages can be obtained, and therefore a unit can be readily adapted to scales of given weighing characteristics even if a different ratio is desirable. Thus by selecting the leverage a relatively small scale can be used to measure a heavy weight, the ratio as said being governed by the effective length of the foot 2 of the weighing frame in relation to the length of the upright 10 to which the scale is connected by the chain 17 and cable 18. A flexible cable could replace the chain, or a chain of the full length required could be used instead of a combined chain and cable.

It will be realised of course that the device need not necessarily have wheels as the lower fulcrum between the operating frame and the weighing frame but this is a convenient arrangement, and also it will be realised that the chain and flexible cable between the weighing frame and the operating frame is not an essential because a lever system or other interconnecting mechanism could be used providing the weighing frame is connected to the scales in such a maner that when the operating frame is moved, the weighing frame will move with it only when the weight of the object resting on the foot balances the pull of the scales on the operating frame.

It would of course also be possible to directly connect the scales between the weighing frame and the operating frame if such were desirable, and obviously the weighing frame need not have a foot and an upright in the manner described because all that is necessary is for these two integers to be interconnected by the weighing means in such a manner that as the operating frame is moved, the weighing frame will record the weight of the object due to differential motion between the weighing frame and the operating frame ceasing when the weight of the object is balanced.

In referring to the weight of the object it is of course clear as described at the commencement of this specification that normally the object will be weighed by taking readings at two opposite points of the object when this rests on the ground or support, so that each time half of the weight is recorded in a case where the content is of uniform weight, or a differential weight is recorded where the weight of the object varies between the two sides at which the weighing is taken. If desired, a filler piece can be used at the opposite end of the case to that which is engaged by the scales to lift that end and act as a fulcrum so that the case is weighed in a substantially horizontal position, which filler could again include a pivoted member to engage the case.

It has been found however that a highly effective and accurate weighing system is provided by the portable scales described herein.

While one complete embodiment of the invention has been disclosed herein, it will be appreciated that modification of this particular embodiment of the invention may be resorted to without departing from the scope of the invention.

What we claim is:

1. A portable scale comprising, an operating frame, an axle on said operating frame, a handle on said operating frame whereby said operating frame can be tilted about said axle, a weighing frame hingedly connected to said operating frame by said axle, a foot on said weighing frame adapted to engage an object to be weighed, loading means to urge the weighing frame into a fixed relationship with the operating frame, and a scale disposed between said weighing frame and said operating frame whereby the extent of deflection of the said operating frame in relation to the said weighing frame against said loading means is indicated on the said scales.

2. A portable scales according to claim 1 wherein a spring is connected at one end to the operating frame and at its other end to flexible means passing over guide means on the operating frame and connecting in turn to the weighing frame.

3. A portable scales according to claim 1 characterised by a member adapted to engage the case or the like to be weighed, said engaging member being hingedly connected to the foot so that the distance between the said hinged connection and the hinged connection of the foot to the operating frame is fixed in relation to the leverage of the weighing system.

4. A portable scales according to claim 1 characterised by antifriction means on the said axle engaging one end of the foot the other end of which foot is adapted to engage a case or the like, said foot having an upright secured thereto which normally lies substantially parallel to the operating frame, and the upper end of which upright is coupled to the scales to measure the amount of deflection of the upright of the weighing frame in relation to the opertaing frame about the antifriction means.

5. A portable scales according to claim 4 characterised by a sprocket wheel rotationally supported on the operating frame, adjacent to the upper end of the upright of the weighing frame, and by a chain secured to the upright adjacent the sprocket which passes around the sprocket and is connected to the scales, said scales including a spring either independently or as a part thereof to form the loading means to urge the weighing frame into a fixed relationship with the operating frame but to allow displacement of the weighing frame to actuate the chain and thus the scales.

References Cited

UNITED STATES PATENTS

| | | | |
|---|---|---|---|
| 194,983 | 9/1877 | Beam | 177—140 |
| 252,070 | 1/1882 | Boyle | 177—140 |
| 432,597 | 7/1890 | Brown | 177—140 X |
| 944,335 | 12/1909 | Lange | 177—140 |

RICHARD B. WILKINSON, Primary Examiner

G. H. MILLER, Jr., Assistant Examiner